No. 756,273. PATENTED APR. 5, 1904.
W. T. OGLESBY.
CREAM SEPARATOR.
APPLICATION FILED JULY 20, 1903.
NO MODEL.
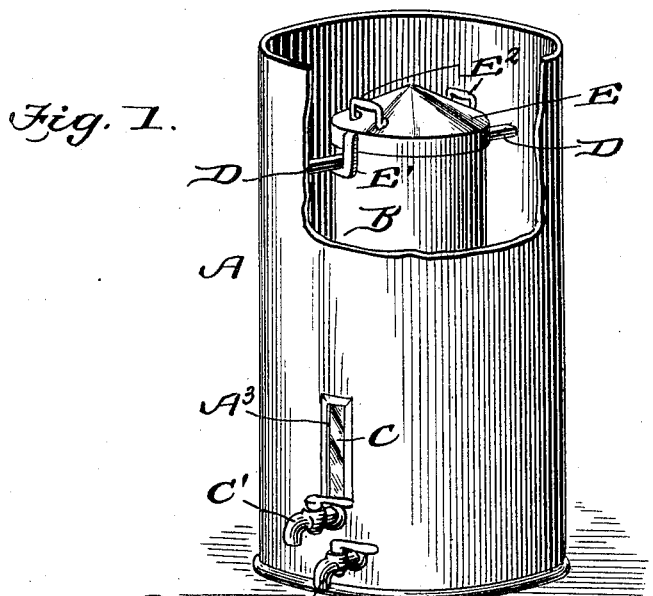
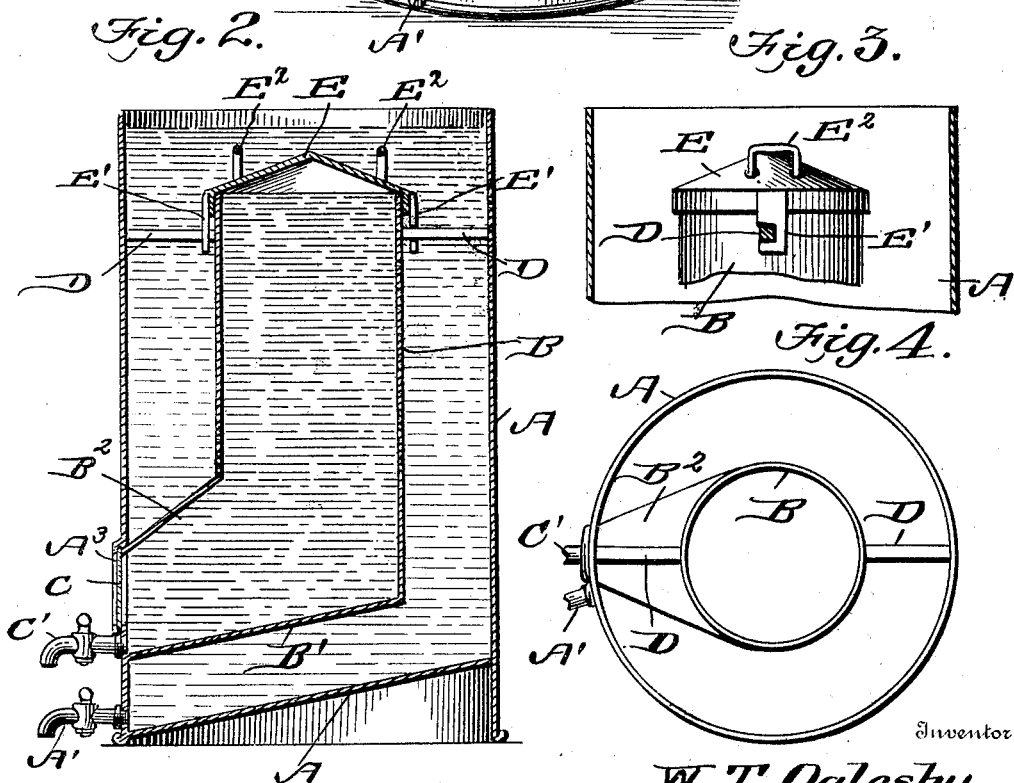
Witnesses
Inventor
W. T. Oglesby.

No. 756,273.

Patented April 5, 1904.

UNITED STATES PATENT OFFICE.

WILLIAM T. OGLESBY, OF KEOKUK, IOWA.

CREAM-SEPARATOR.

SPECIFICATION forming part of Letters Patent No. 756,273, dated April 5, 1904.

Application filed July 20, 1903. Serial No. 166,353. (No model.)

*To all whom it may concern:*

Be it known that I, WILLIAM T. OGLESBY, a citizen of the United States, residing at Keokuk, in the county of Lee and State of Iowa, have invented a new and useful Cream-Separator, of which the following is a specification.

My invention is an improvement in cream-separators, and has for its object the separation of the cream from the milk by rapidly lowering the temperature of the milk and cream held suspended therein, causing the latter to thicken and rise to the surface; and a further object is to maintain this lowered temperature in the upper portion of the separator after the cream has risen to the surface. To accomplish these objects, the can containing the milk and cream is completely submerged in ice-cold water, the cold water coming into contact with the top and bottom of the milk-can as well as with the sides.

My invention consists in the novel features of construction and combination of parts hereinafter described, particularly pointed out in the claims, and shown in the accompanying drawings, in which—

Figure 1 is a perspective view of my separator, one side of the water-can being partly broken away. Fig. 2 is a vertical section through the separator. Fig. 3 is a detail view, partly in section, showing means of fastening the top of the milk-can in place. Fig. 4 is a plan view.

In constructing my separator I employ an outer can A, open at the top and preferably cylindrical, in which the cold water is kept. The can A has a discharge-spigot A' and a bottom $A^2$, sloping downwardly to the discharge-outlet, thereby draining off sediment, &c.

The milk-can B is smaller in diameter than the can A and is arranged centrally in the the latter can. The bottom B' of the milk-can is inclined and parallel to the bottom of the can A. The bottom B' of the milk-can is on its forward side extended to the wall of the can A, to which it is connected, and adjacent the bottom the front side of the can B is also extended and secured to the sides of the can A, forming a lateral extension of the can B, as shown at $B^2$. The wall of the can A is vertically slotted at $A^3$ in alinement with this extension of the can B, and the opening so formed is closed by a glass panel C. A faucet C' is arranged below the panel C, through which the contents of the milk-can can be drawn off. Adjacent the top of the milk-can, which is some distance below the top of the water-can, braces D are secured at one end to the inner sides of the water-can and at the opposite end to the milk-can, acting as a support and brace for the latter. It will be observed from this construction that the milk-can is supported within the can A from the sides of the same and that with the exception of the extension $B^2$ the milk-can is spaced on all sides from the walls of the can A.

The top E of the milk-can is conical and is flanged to fit tightly over the upper portion of the milk-can. To these flanges are secured downwardly-extending ears E', notched, as shown, and handles $E^2$ are secured on the top of the milk-can. When the top is placed in position on the milk-can, it is caught by the handles $E^2$ and rotated until the notched ears engage the braces D, when the top will be securely locked in position. By having the top conical a space is left in which air can circulate above the cream.

After the milk-can has been filled and the top locked in position cold water is poured into the can A until the can B is entirely submerged. Ice can be placed in the can A, if desired.

Having thus fully described my invention, what I claim as new, and desire to secure by Letters Patent, is—

1. The combination with a receptacle adapted to hold water and having an inclined bottom, a can adapted to contain milk supported centrally in said receptacle and having an inclined bottom extending to one side of the receptacle the adjacent sides of the can being also extended to the same side of the receptacle, the said side forming at this point a portion of the side wall of the can and being vertically slotted between the extending sides of the can, a faucet arranged in said side portion of the receptacle, adapted to discharge the contents of the can, a cover for said can, braces connecting the upper portions of the receptale and can, and means for drawing off the contents of the receptacle.

2. The combination with a cylindrical water-can having a forwardly-inclined bottom and a discharge-spigot adjacent said bottom, a milk-can arranged in said water-can and having an inclined bottom parallel to the bottom of the water-can, said bottom being extended on the forward side to the front side of the water-can and the sides of the milk-can adjacent the extended bottom being also extended to the front side of the water-can, said side of the water-can being slotted, a glass panel in said slot, a faucet arranged below the panel and adapted to discharge the contents of the milk-can, braces adjacent the top of the milk-can said braces extending from the sides of one can to the other, a conical top fitting over the milk-can and notched ears depending from said top and adapted to engage the braces.

WILLIAM T. OGLESBY.

Witnesses:
B. R. HIGGASON,
MINNIE E. HIGGASON.